Figure 1:
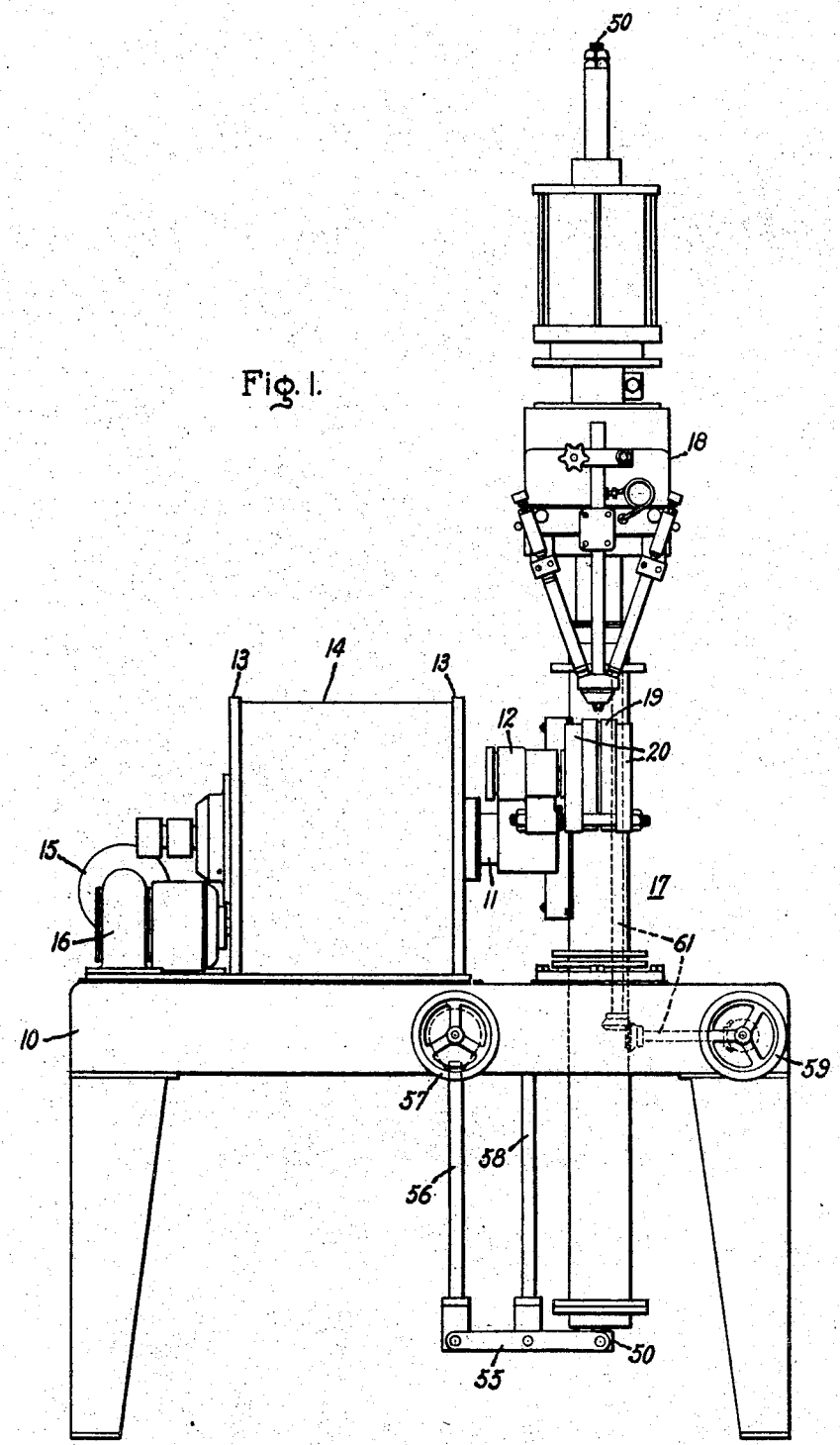

Sept. 12, 1944.  J. T. CATLETT  2,358,144
WELDING APPARATUS
Filed Nov. 4, 1940  4 Sheets-Sheet 1

Inventor:
James T. Catlett,
by Harry E. Dunham
His Attorney.

Sept. 12, 1944.   J. T. CATLETT   2,358,144
WELDING APPARATUS
Filed Nov. 4, 1940   4 Sheets-Sheet 2
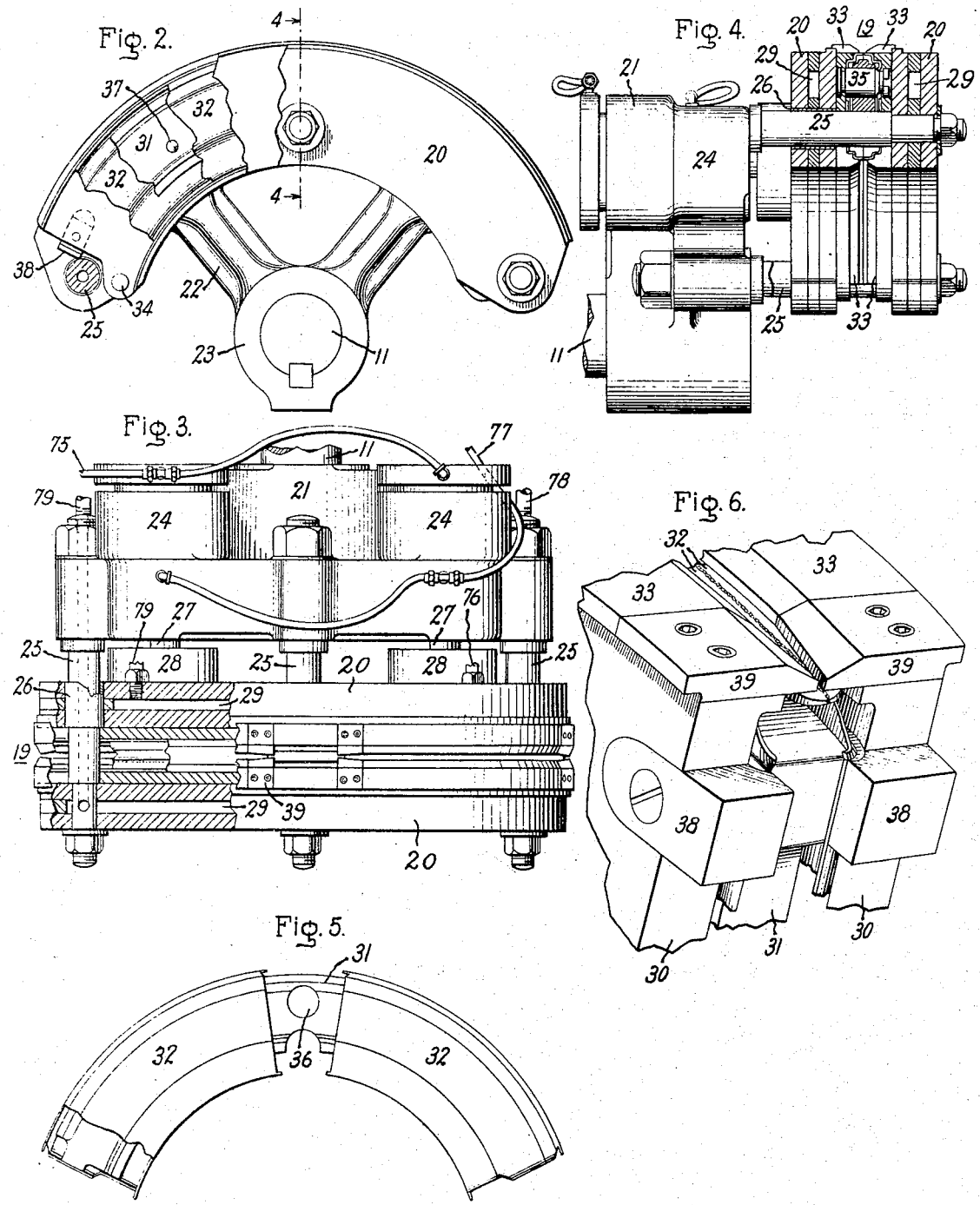

Sept. 12, 1944.　　　　J. T. CATLETT　　　　2,358,144
WELDING APPARATUS
Filed Nov. 4, 1940　　　　4 Sheets-Sheet 3
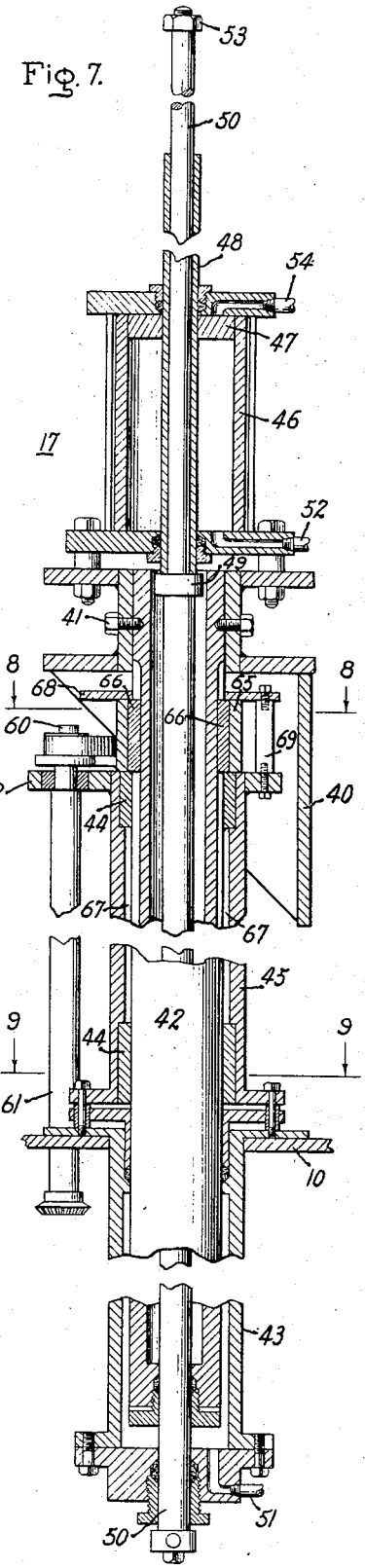
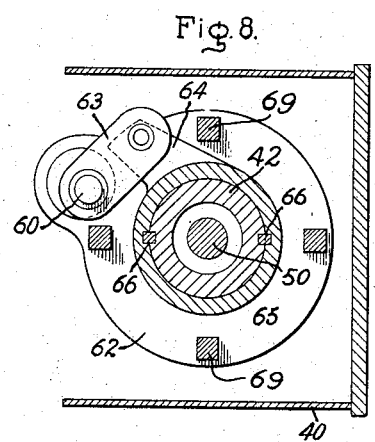
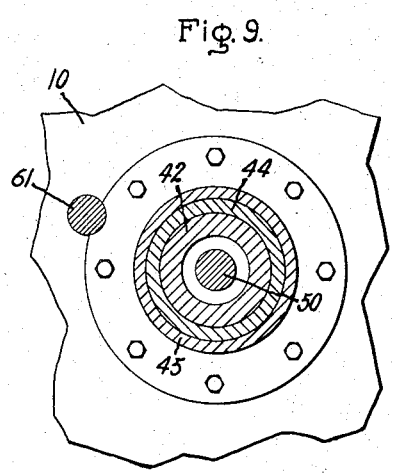
Inventor:
James T. Catlett,
by Harry E. Dunham
His Attorney.

Inventor:
James T. Catlett,
by Harry E. Dunham
His Attorney.

Patented Sept. 12, 1944

2,358,144

UNITED STATES PATENT OFFICE 2,358,144

WELDING APPARATUS

James T. Catlett, Scotia, N. Y., assignor to General Electric Company, a corporation of New York Application November 4, 1940, Serial No. 364,168

12 Claims. (Cl. 113—59)

My invention relates to fusion welding apparatus particularly suited for joining work assemblies along inner and outer concentric arcuate seams. Certain aspects of my invention are, however, of more general application in that they relate to apparatus for controlling weld penetration and particularly notch-back at the end of a fusion weld. This notch-back control is accomplished by conducting heat from the seam at the ends thereof in progressively increasing amounts sufficient to taper off weld penetration at the ends of the seam, where if this penetration is not thus decreased, the molten metal in the seam runs back from the end of the seam forming a ball of metal which results in a decided notch at the end of the seam.

The machine illustrated in the drawings is particularly suited for welding magazine cases for Bren machine guns. The nature of these cases is fully illustrated and described in an article in Machinery (London) for July 21, 1938, pages 481 to 484. These magazine cases have also been illustrated in applicant's drawings.

These cases are formed from two stampings which when assembled present for welding inner and outer arcuate concentric seams which extend along the inner and outer edges of the cases which are segmental in shape.

It is an object of my invention to provide a welding machine in which the inner and outer concentric arcuate seams of a work assembly are traversed relatively to a welding agency which is properly positioned over the assembly so that both its seams may be welded by one positioning of the work assembly in the machine.

It is a further object of my invention to provide a work holding jig and offset segmental clamp in which said jig is properly located so that rotation of the clamp traverses inner and outer arcuate work seams relative to a single welding agency which may be properly positioned for welding either of these seams depending upon the arc of travel of the work clamp and jig supported therein.

Another object of my invention is to provide apparatus for fusion welding seams whereby notch-back at their ends is prevented.

Further objects and advantages of my invention will become apparent from the following description of the embodiment thereof illustrated in the accompanying drawings.

Figure 10:
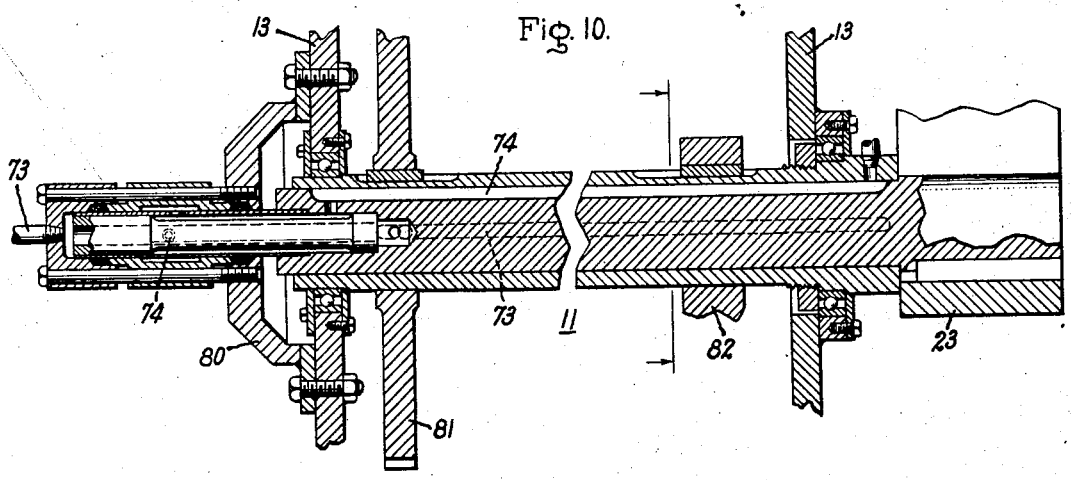
Figure 11:
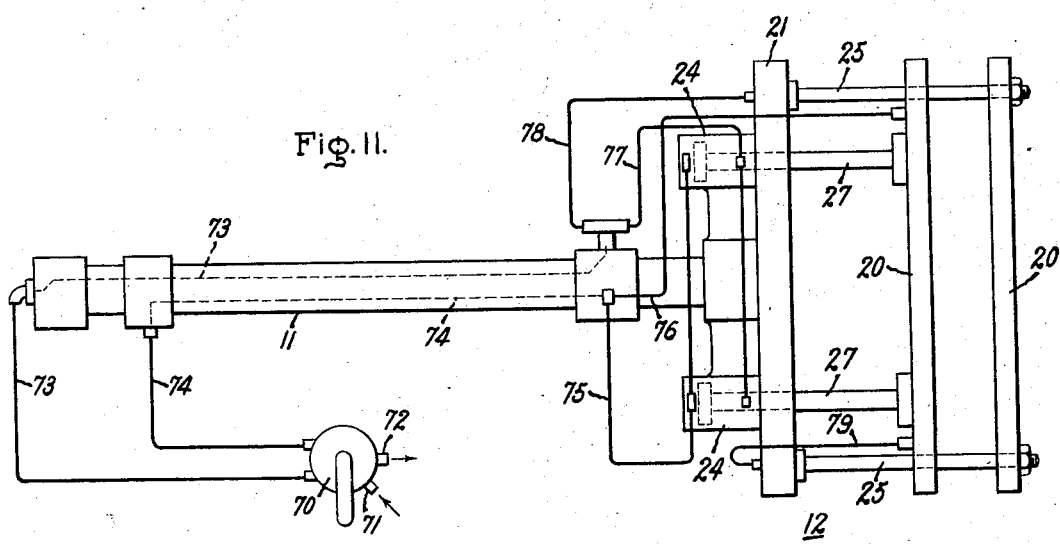
Figure 12:
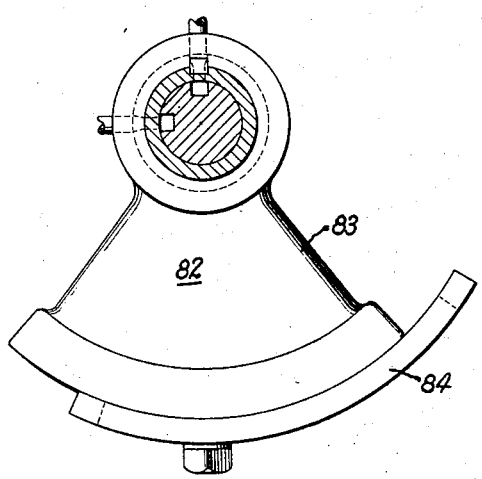

In these drawings Fig. 1 is a front view of a welding machine embodying my invention; Figs. 2 and 3 are side and plan views of the work clamp and jig with portions broken away to illustrate the constructions thereof; Fig. 4 is a side view in which a section of the work clamping members and jig has been taken along line 4—4 of Fig. 2; Fig. 5 is a side view showing two magazine cases supported on a mandrel forming part of the jig; Fig. 6 is an enlarged view of one end of the jig showing the construction thereof whereby notch-back at the end of a seam is prevented; Fig. 7 is a side sectional view of the support for the welding agency by means of which it is located in either of two welding positions or moved a substantial distance away from the work clamp to facilitate loading and unloading thereof; Fig. 8 is a sectional view of this same support along line 8—8 of Fig. 7; Fig. 9 is another sectional view of this same support along line 9—9 of Fig. 7; Fig. 10 is a sectional view of the supporting axle for the work clamp illustrating the passages therethrough for pressure fluid, its manner of support and the location thereon of a counterbalance for the work clamp; Fig. 11 is a diagram illustrating the manner in which fluid under pressure is supplied to the work clamp for cooling the clamping members thereof and to the fluid operated mechanism by means of which its clamping members are moved toward and away from one another, and Fig. 12 is a side view of the counterbalance above referred to.

The machine illustrated in Fig. 1 comprises a table-like frame 10 upon which an axle 11 for the work clamp 12 is rotatably supported in end frames 13 mounted thereon. This axle is driven through a gear transmission enclosed within a hood 14 mounted on these end frames 13. This gear transmission is driven by a motor 15 which is connected thereto through a speed reducer 16. Motor 15 and speed reducer 16 are mounted on frame 10. Also mounted on frame 10 is a support 17 for positioning the welding agency 18 relative to a jig 19 which is positioned between the clamping members 20 of the work clamp 12. This jig holds the work in assembled position for welding and is located between clamping members 20 of the work clamp 12. The welding agency illustrated is an automatic atomic hydrogen welding head having substantially the same construction as that illustrated and described in my United States Letters Patent 1,946,305 granted February 6, 1934.

The construction of the work clamp 12 and jig 19 as well as the assembly of the work parts in the jig will become apparent from a consideration of Figs. 2 to 6, inclusive.

The work clamp as shown in Figs. 2, 3 and 4, comprises a body portion 21 connected through spokes 22 to a hub 23 which is mounted on and keyed to one end of axle 11. Forming an integral part of the body portion 21 of the clamp are two cylinders 24 of a fluid operated mechanism for its clamping members 20. These clamping members are segmental in shape and offset from the body portion of the clamp by being mounted on pins 25 which are bolted to the body portion of the clamp. The outer clamping member 20 is stationary, being bolted against a shouldered portion at the outer end of each of the pins 25. The inner clamping member 20 is supported on the middle portions of these pins 25 and slidably mounted thereon through bushings 26. The inner face of the inner clamping member is connected through piston rods 27 to the pistons in cylinders 24. Stops 28 which limit the travel of inner clamping member 20 toward the body portion 21 of the work clamp serve to connect piston rods 27 to this clamping member. As shown in the drawings, the clamping members 20 are provided with passageways 29 for the circulation of cooling fluid therethrough. These passageways are series connected through a conduit system which will be described below.

Jig 19, located in Figs. 2, 3 and 4 between the clamping members 20, has the construction illustrated in these figures as well as in Figs. 5 and 6. It comprises, as best shown in Fig. 6, two segmental plates 30 and a mandrel 31. This mandrel is also shown in Fig. 5. The two stampings 32, which when welded together constitute the magazine case, are positioned on mandrel 31 as shown in Fig. 5 and this assembly is then clamped between jig plates 30. The mandrel and jig plates are shaped to conform with portions of stampings 32 so as to hold them in assembled relationship with the inner and outer concentric arcuate seams located between inner and outer jaw portions 33 of the jig plates. The outer jaw portions have flanged portions which extend beyond the outside side surfaces of jig plates 30 end engage the outside edges of clamping members 20 to position the jig relative thereto. The opening movement of clamping members 20 is limited by stops 28 so that the jig is limited in its passage therebetween by the flanged portions of the outer jaws 33 which extend beyond the outside surfaces of jig plates 30.

The segmental jig plates are positioned relatively to one another by dowels 34 (Fig. 2) located at their inner end portions, and the jig plates are fastened together by a locking pin 35 (Fig. 4) which passes through an opening 36 in mandrel 31. One end of locking pin 35 is rotatably supported in one of the jig plates and its other end is provided with a configuration which latches with a similar configuration in the other jig plate. Mandrel 31 may be provided with spring pressed bosses 37 which extend from the surface of mandrel 31 into engagement with the stampings of the magazine case in order to exert a pressure through them on the jig plates and thus tension the latching mechanism including pin 35. Lugs 38 attached to the ends of jig plates 30 also serve to hold and position the inturned portions of the discharge end of the magazine cases as shown in Figs. 5 and 6. The other ends of these cases are open thus permitting the welded assembly to be withdrawn from each end of mandrel 31.

As best shown in Figs. 3 and 6, clamping jaws 33 of jig plates 30 progressively converge toward one another at each end of a seam to be welded to increase conduction of heat from the seam at its ends. In the construction illustrated, this progressive convergence of the jaws is obtained through the use of inserts 39 preferably of a material having a greater heat conductivity than the jig plates. It is obvious however that other arrangements may be made to accomplish the same result. In the arrangement illustrated, the jig plates are made of steel and the inserts of copper which has a high heat conductivity. The result desired is that the work clamp through work engaging members conduct heat away from the seam at a substantially uniform rate throughout the length of the seam except at its ends where the conduction of heat from the seam is progressively increased so as to taper off weld penetration at the ends of the seam. This tapering off of weld penetration at the ends of the seam prevents notch-back which would occur if the same pool of molten metal were obtained at the ends of the weld as is obtained during welding its center portions. The notch-back results from such pool of molten metal forming a ball short of the ends of the seam by the withdrawal of molten metal from the ends of the seam probably due to a surface tension effect.

The jaw construction of the inner and outer edges of the jig plates is substantially uniform and these jaws are substantially uniformly spaced from opposite sides of the seam except at its ends where they progressively converge toward one another and the seam to increase conduction of heat from the seam and thereby reduce weld penetration and prevent notch-back. It is to be noted that the welding agency which has a substantially constant output is traversed relatively to the seam at a substantially uniform rate of speed and at a substantially uniform spacing therefrom. The heat output of the welding agency is not controlled at the end of the seam in order to control weld penetration. This weld penetration is regulated by controlling the amount of heat extracted from the seam through the agency of jaws forming part of the work clamp.

The welding agency 18 is positioned in the plane of rotation of the concentric arcuate seams in the magazine cases by a support 17. The construction of this support is shown in Figs. 7, 8 and 9. The welding agency is attached to a bracket 40 which is attached by bolts 41 to the upper end of a piston 42 whose lower end is enclosed by a cylinder 43. The upper portion of piston 42 engages bearings 44 located in the end portions of a guiding cylinder 45. Cylinders 43 and 45 are attached to the top surface of frame 10 of the welding machine.

Also attached to bracket 40 is a cylinder 46 which encloses a piston 47 mounted on a hollow piston rod 48. As shown in Fig. 7, the lower welding position of bracket 40, and of the welding agency supported thereon, is determined by the engagement of the lower end of hollow piston rod 48 with shoulder 49 of a rod 50 which extends lengthwise through the hollow piston rod 48, piston 42, and the lower end of cylinder 43. If fluid at the same pressure is admitted to cylinders 43 and 46 through passageways 51 and 52, piston 42 will move upwardly through cylinder 43 until piston rod 48 engages a nut 53 at the upper end of rod 50. This will locate the welding agency supported on bracket 40 in its upper welding position. Piston rod 48 will not move relative to its cylinder 46 since piston 47 is held in the upper portion of its cylinder by fluid admitted through passage 52. It is to be noted that the area of piston 47 is much greater than the area of piston 42 and consequently fluid at the same pressure admitted to cylinders 43 and 46 will cause movement of piston 42 in cylinder 43 but will prohibit movement of piston 47 in cylinder 46.

If it is desirable to move bracket 40 and consequently the welding agency still further away from the work clamp to facilitate loading or unloading operations, this may be accomplished by admitting fluid under pressure through a passage 54 to the upper portion of cylinder 46 and exhausting fluid through passageway 52 from the lower portion of cylinder 46 while maintaining the fluid pressure connection with cylinder 43 through its passageway 51. This will cause cylinder 46 and consequently bracket 40, to travel upwardly until piston 47 engages the bottom end portion of cylinder 46. Cylinder 46 and piston 47 consequently form part of a means for moving the supporting bracket 40 and consequently the welding agency to a loading and unloading position beyond the position determined by nut 53 on rod 50. Nut 53 and shoulder 49 on rod 50 constitute stops which position the welding agency supported on bracket 40 in either of two welding positions. Bracket 40 and the welding agency mounted thereon are moved from one welding position to the other welding position determined by these stops through the agency of means including piston 42 and cylinder 43.

The welding positions may be adjusted by adjusting the positions of stops 49 and 53. This may be done by moving rod 50 relatively to frame 10 simultaneously to adjust both welding positions and by adjusting the position of nut 53 on rod 50 to adjust one welding position relative to the other. As shown in Fig. 1, rod 50 is connected to one end of a lever 55 whose other end is connected to a rod 56 which is adjustable relative to the machine frame 10 by a cam operated through the agency of a hand wheel 57. The mid-portion of lever 55 is pivotally supported at the lower end of a rod 58 whose upper end is attached to machine frame 10.

Means are also provided for swinging bracket 40 about the longitudinal axis of rod 50 so that the welding agency may be adjusted transversely to the line of welding. This adjustment is provided through a mechanism terminating in a hand wheel 59 (Fig. 1). This hand wheel rotates a crank pin 60 (Figs. 7 and 8) through a transmission including gear connected shafts 61. One of these shafts 61 as shown in Fig. 7 extends along guide cylinder 45 of support 17 and is supported in the frame 10 and flange 62 attached to the upper portion of cylinder 45. This crank pin is connected through a link 63 to an arm 64 attached to a collar 65 which is connected through keys 66 with piston 42. Elongated key ways 67 in piston 42 provide for relative movement of this piston and collar to which keys 66 are attached. Collar 65 is held in place on the upper end of cylinder 45 by a cover plate 68 which is attached through spacers 69 to flange 62 forming part of the upper end of guide cylinder 45. It is thus apparent that by rotating hand wheel 57, shafts 61 are rotated and in turn rotate collar 65 and piston 42. The rotation of piston 42 rotates the support bracket 40 for the welding agency.

As stated above, cooling fluid is supplied under pressure to the clamping members 20 of work clamp 12 as well as to opposite ends of cylinders 24 forming part of the fluid operated mechanism for moving the clamping members 20 relative to one another. As shown in Fig. 11, this cooling fluid is supplied through a valve 70 which is connected to a source of fluid pressure 71 and to an exhaust passageway 72. Fluid under pressure may be supplied through valve 70 to either of two conduits 73 or 74 when the other of these conduits is connected to the exhaust 72.

Conduits 73 and 74 extend through axle 11 on one end of which work clamp 12 is supported. Near the work clamp each of these conduits branches into parallel connected conduits which are respectively connected to cylinders 24 and to the cooling passages in clamping members 20. Conduit 74 branches into a conduit 75 which is connected to corresponding ends of cylinders 24 and into a conduit 76 which connects with one end of the cooling passageway extending through the inner clamping member 20. Conduit 73 branches into a conduit 77 which is connected with the corresponding opposite ends of cylinders 24 and into a conduit 78 which is connected through a passage in an outside pin 25 to the corresponding end of the cooling passage in the outer clamping member 20. The other ends of the cooling passages in the inner and outer clamping members 20 are also connected in series with one another through a conduit 79 and a passageway through an oppositely located outside pin 25. The passageways through which the cooling fluid is supplied to the clamping members 20 must either be of such size as to impede the flow of fluid therethrough so as to build up the necessary operating pressure for the fluid cylinders 24 or a restriction may be placed in this cooling passageway for accomplishing this result.

The physical structure of axle 11 is shown in Fig. 10. As shown in this figure opposite ends thereof are supported in end frames 13 through the agency of ball bearings. Fluid passages 73 and 74 are also illustrated in these drawings as well as the connection permitting relative movement between the rotating and stationary portions of these conduits. The coupling between the stationary and rotating portions of these conduits are supported by a bracket 80 which is bolted to one of the end frames 13.

A gear 81 forming part of the transmission between motor 15 and axle 11 is shown in Fig. 10. In this same figure part of a counterbalance 82 for work clamp 12 is also shown. This counterbalance is fully illustrated in Fig. 12. As shown in this figure, it comprises a segmental weight 83 to the rim of which there is adjustably attached another weight 84. By shifting weight 84 relative to weight 83, an adjustment is provided for accurately balancing the work clamp, jig, and work parts also supported on this same shaft.

Not shown in any of the drawings are certain control switches which are also mounted on axle 11. These control switches are employed for starting and stopping the welding agency and form part of the control of the welding agency and travel motor 15.

In view of the above description, it is believed that the operation of my welding machine is apparent. Briefly stated it is as follows:

Two pairs of complementary punchings, which in assembled relationship form two magazine cases, are assembled on mandrel 31 and between jig plates 30 as shown in the drawings. This assembly is then inserted between clamping members 20 of the work clamp 12 where it is positioned by the outside flanges of outer jaws 33 engaging corresponding edges of clamping members 20. Valve 70 is then operated to close the clamp which holds the jig by reason of its configuration properly positioned relative to the welding agency 18.

Either the outside or inside concentric seam is then welded by properly positioning the welding agency relatively to the work clamp and jig by positioning support 17 through the control of fluid pressure in cylinders 43 and 46. The operation of the welding agency is then initiated if not already functioning, and feed motor 15 traverses the work assembly jig and clamping members at a substantially uniform rate of speed past the welding agency. This agency is supported at a substantially uniform distance from the seam to be welded throughout a complete welding operation.

After one of the concentric arcuate seams has been welded, the welding agency is then positioned for welding the other seam. Interference between the welding agency and the work clamp is prevented by the control switches above mentioned which are mounted on the axle of the work clamp. These control switches may also actuate valves to control fluid pressure in cylinders 43 and 46 to provide a fully automatic operation of the welding machine. With such operation, the welding head would be lowered from its loading position into a position for welding one of the seams and after welding this seam would automatically be transferred to a position for welding the other seam which would then be welded. After both seams had been welded, the welding head would again be moved to its loading position. The jig and welded assembly are then removed from work clamp 12. The welded cases are then removed from the jig by opening jig plates 30 and withdrawing them from mandrel 31.

To facilitate speed in welding, a plurality of jigs and mandrels may be provided so that loading and unloading operations thereof may be performed by the welding operator while the welding machine is performing a welding operation.

It is of course apparent that many variations may be made in the construction and arrangement of parts of a welding machine embodying my invention. It will, of course, be necessary to change the configuration and shape of the jig and work clamp to accommodate various work assemblies providing inner and outer concentric arcuate seams to be welded. The work holding arrangement when constructed to perform my method of welding, will always operate to conduct heat from the seam at a substantially uniform rate except at its ends where heat will be conducted from the seam in progressively increasing amounts sufficient to taper off weld penetration at the ends of the seam and thus prevent notch-back due to the action of the welding agency. Such an arrangement makes it unnecessary to control the heat supplied by the welding agency at the ends of the seam, as has been previously proposed.

It is to be understood that the machine above illustrated and described is but one embodiment of my invention and of the principles thereof involved. I therefore aim in the appended claims to cover all modifications of my invention which fall within the true spirit and scope thereof.

What I claim as new and desire to secure by Letters Patent of the United States is:

1. Welding apparatus comprising a welding agency of substantially constant heat output, a work clamp having heat conducting jaw members which are spaced from one another and engage the work in said clamp on opposite sides of the seam to be welded, and means for traversing said welding agency and said work clamp relatively to one another along said seam and across its ends at a substantially uniform rate of speed with said welding agency spaced a substantially uniform distance from said seam, said jaw members of said work clamp being formed at their ends and at the ends of said seam of a material having a greater heat conductivity than the material of which they are formed intermediate their ends and the ends of said seam, the relative spacing and heat conductivities of said jaw members being such as to increase the conduction of heat from said seam at its ends and thereby reduce weld penetration and prevent notching of said work at the ends of said seam due to the heat supplied thereto by traversing said welding agency along said seam and across its ends.

2. Welding apparatus comprising a welding agency of substantially constant heat output, a work clamp having heat conducting jaw members which are spaced from one another and engage the work in said clamp on opposite sides of the seam to be welded, and means for traversing said welding agency and said work clamp relatively to one another along said seam and across its ends at a substantially uniform rate of speed with said welding agency spaced a substantially uniform distance from said seam, said jaw members of said work clamp being substantially uniformly spaced from opposite sides of said seam except at its ends where they progressively converge toward one another and said seam at their ends and the ends of said seam to increase conduction of heat from said seam and thereby reduce weld penetration and prevent notching of said work at the ends of said seam due to the heat supplied by traversing said welding agency along said seam and across its ends.

3. Welding apparatus comprising a segmental clamp, means offset from one side of said clamp for rotating it in a plane about an axis of rotation, means for positioning inner and outer concentric arcuate seams of a work assembly in said clamp with their common center in said axis of rotation of said clamp, said means having jaw members which have end portions of a material whose heat conductivity is greater than that of the material between said end portions and which when in engagement with said work assembly are substantially equally spaced from opposite sides of said inner and outer concentric arcuate seams except at their ends where they progressively converge toward one another and the ends of said seams, a welding head, means for supporting said welding head opposite said seams in said plane of rotation of said clamp, and means for moving said welding head and said clamp relatively to one another in said plane of rotation of said clamp from a welding position spaced from said axis of rotation of said clamp a distance suitable for welding one of said concentric arcuate seams to a welding position spaced from said axis of rotation of said clamp a distance suitable for welding the other of said concentric arcuate seams.

4. Welding apparatus comprising a welding agency, a work clamp having relatively movable clamping members, fluid operated means in said clamp for moving one of said clamping members relatively to the other of said clamping members, fluid cooling passages in said clamping members, means for supplying fluid under pressure through parallel connected passageways to said fluid operated means and to said cooling passages, said cooling passages restricting the flow of fluid therethrough sufficiently to build up a desired fluid operating pressure in said fluid operated means, and means for transversing said welding agency and said work clamp relatively to one another.

5. Welding apparatus comprising an axle, means for supporting and rotating said axle about its longitudinal axis, a segmental clamp having relatively movable clamping members, means offset from one end of said axle for supporting said clamp for rotation in a plane about the axis of rotation of said axle, fluid operated means for moving one of said clamping members relatively to the other of said clamping members, fluid cooling passages in said clamping members, means for supplying fluid under pressure through passageways in said axle and through parallel connected passageways to said fluid operated means and to said cooling passages, said cooling passages restricting the flow of fluid therethrough sufficiently to build up a desired fluid operating pressure in said fluid operated means, means for positioning inner and outer concentric arcuate seams of a work assembly in said clamp with their common center in the axis of rotation of said axle, a welding head, means for supporting said welding head opposite said seams in said plane of rotation of said clamp, and means for moving said welding head relatively to said clamp from a welding position suitable for welding one of said concentric arcuate seams to a welding position suitable for welding the other of said concentric arcuate seams.

6. Welding apparatus comprising a segmental clamp, means offset from one side of said clamp for rotating it in a plane about an axis of rotation, means for positioning inner and outer concentric arcuate seams of a work assembly in said clamp along opposite sides thereof with their common center in said axis of rotation of said clamp, a welding head, means for supporting said welding head opposite said seams in said plane of rotation of said clamp, and means for moving said welding head and said clamp relatively to one another in said plane of rotation of said clamp from a welding position spaced from said axis of rotation of said clamp a distance suitable for welding one of said concentric arcuate seams to a welding position spaced from said axis of rotation of said clamp a distance suitable for welding the other of said concentric arcuate seams.

7. Welding apparatus comprising a segmental clamp, means offset from one side of said clamp for rotating it in a plane about an axis of rotation, means for positioning inner and outer concentric arcuate seams of a work assembly in said clamp along opposite sides thereof with their common center in said axis of rotation of said clamp, means for rotating said clamp about said axis of rotation, a welding head, means for supporting said welding head in said plane of rotation of said clamp, means for moving said welding head and said clamp relatively to one another in said plane of rotation of said clamp from a welding position spaced from said axis of rotation of said clamp a distance suitable for welding one of said concentric arcuate seams to a welding position spaced from said axis of rotation of said clamp a distance suitable for welding the other of said concentric arcuate seams, and additional means for moving said welding head and said clamp relatively to one another in said plane of rotation of said clamp away from said axis of rotation of said clamp a sufficient distance from one of said welding positions to facilitate loading and unloading work from said clamp.

8. Welding apparatus comprising a segmental clamp, means offset from one side of said clamp for rotating it in a plane about an axis of rotation, means for positioning inner and outer concentric arcuate seams of a work assembly in said clamp along opposite sides thereof with their common center in said axis of rotation of said clamp, means for rotating said clamp about said axis of rotation, a welding agency, a support which positions said welding agency in said plane of rotation of said clamp for travel toward and away from said axis of rotation of said clamp, a plurality of stops located in the path of travel of said support and acting thereon when said welding agency is in welding positions for said inner and outer concentric seams of the work supported in said clamp, means including a piston and cylinder for moving said support from the position determined by one of said stops to the position determined by the other of said stops, and means including a second piston and cylinder for moving said support beyond the position determined by one of said stops.

9. Welding apparatus comprising a segmental clamp, means offset from one side of said clamp for rotating it in a plane about an axis of rotation, means for positioning inner and outer concentric arcuate seams of a work assembly in said clamp along opposite sides thereof with their common center in said axis of rotation of said clamp, means for rotating said clamp about said axis of rotation, a welding agency, a support which positions said welding agency in said plane of rotation of said clamp for travel toward and away from said axis of rotation of said clamp, a plurality of stops located in the path of travel of said support and acting thereon when said welding agency is in welding positions for said inner and outer concentric seams of the work supported in said clamp, means for adjusting said stops in the direction of travel of said support relative thereto, means including a piston and cylinder for moving said support from the position determined by one of said stops to the position determined by the other of said stops, and means including a second piston and cylinder for moving said support beyond the position determined by one of said stops.

10. Welding apparatus comprising a segmental clamp, means offset from one side of said clamp for rotating it in a plane about an axis of rotation, means for positioning inner and outer concentric arcuate seams of a work assembly in said clamp along opposite sides thereof with their common center in said axis of rotation of said clamp, means for rotating said clamp about said axis of rotation, a welding agency, a support which positions said welding agency in said plane of rotation of said clamp for travel toward and away from said axis of rotation of said clamp, a plurality of stops located in the path of travel of said support and acting thereon when said welding agency is in welding positions for said inner and outer concentric seams of the work supported in said clamp, means for adjusting said stops in the direction of travel of said support relative thereto, means including a piston and cylinder for moving said support from the position determined by one of said stops to the position determined by the other of said stops, means including a second piston and cylinder for moving said support beyond the position determined by one of said stops, and means for rotating said support and thereby adjusting said welding agency transversely of the seam being welded.

11. Welding apparatus comprising an axle, means for supporting said axle for rotation about its longitudinal axis, means for rotating said axle about its longitudinal axis, a segmental clamp having relatively movable clamping members offset from one side of said axle, means for moving one of said clamping members relatively to the other of said clamping members, means for positioning inner and outer concentric arcuate seams of a work assembly in said clamp with their common center in the axis of rotation of said axle, a welding agency, a support which positions said welding agency for relative travel along said concentric arcuate seams of said work assembly in said clamp, means including a piston and cylinder for moving said support toward and away from said clamp to position said welding agency for welding one or the other of said concentric arcuate seams of said work assembly in said clamp, a second piston and cylinder one element of which is attached to said support and the other element of which is movable relatively thereto, said second piston and cylinder having a piston area greater than the piston area of said first mentioned piston and cylinder, a stop at each end of and in the path of travel of said other element of said second piston and cylinder, and means for supplying pressure fluid to one end of said first mentioned cylinder and to opposite ends of said second mentioned cylinder to locate said welding agency in welding positions for one or the other of said concentric arcuate seams of the work assembly in said clamp and in a loading and unloading position spaced from one of said welding positions by a predetermined distance equal to the stroke of said second mentioned piston and cylinder.

12. Welding apparatus comprising an axle, means for supporting said axle for rotation about its longitudinal axis, means for rotating said axle about its longitudinal axis, a segmental clamp having relatively movable clamping members offset from one end of said axle, fluid operated means in said clamp for moving one of said clamping members relatively to the other of said clamping members, fluid cooling passages in said clamping members, means for supplying fluid under pressure through passageways in said axle and through parallel connected passageways to said fluid operated means and to said cooling passages, said cooling passages restricting the flow of fluid therethrough sufficiently to build up a desired fluid operating pressure in said fluid operated means, means for positioning inner and outer concentric arcuate seams of a work assembly in said clamp with their common center in the axis of rotation of said axle, said means having jaw members which make a heat conductive engagement with said work assembly and are of substantially uniform construction and substantially equally spaced from each other and said seams except at the ends of said seams where they progressively converge toward one another and said seams to increase conduction of heat therefrom, a welding agency, a support therefor, a plurality of stops for locating said support in welding positions for said inner and outer concentric seams of the work supported in said clamp, means for adjusting said stops in the direction of travel of said support relative thereto, means including a piston and cylinder for moving said support from the position determined by one of said stops to the position determined by the other of said stops, means including a second piston and cylinder for moving said support beyond the position determined by one of said stops, and means for rotating said support to adjust said welding agency transversely of the seam being welded.

JAMES T. CATLETT.